United States Patent
McCrackin et al.

(10) Patent No.: US 11,516,406 B2
(45) Date of Patent: Nov. 29, 2022

(54) ADAPTIVE BORESCOPE INSPECTION

(71) Applicant: Baker Hughes Oilfield Operations LLC, Houston, TX (US)

(72) Inventors: Sheldon McCrackin, Houston, TX (US); Jeremy Vandam, Edmond, OK (US); Carlneil Domkam, Houston, TX (US); Samvid Jhaveri, Oklahoma City, OK (US); Brice Kim, Houston, TX (US); Kevin Coombs, Houston, TX (US); Matthew Pankow, Houston, TX (US); Tom Lambdin, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/082,194

(22) Filed: Oct. 28, 2020

(65) Prior Publication Data

US 2022/0132040 A1 Apr. 28, 2022

(51) Int. Cl.
*H04N 5/232* (2006.01)
*G06T 1/00* (2006.01)
(Continued)

(52) U.S. Cl.
CPC ....... *H04N 5/23299* (2018.08); *G06T 1/0014* (2013.01); *G06T 7/0004* (2013.01);
(Continued)

(58) Field of Classification Search
CPC ........ H04N 5/23299; H04N 2005/2255; G06T 7/0004; G06T 1/0014; G06T 2207/30164
See application file for complete search history.

(56) References Cited

U.S. PATENT DOCUMENTS 9,471,057 B2 * 10/2016 Scheid ................. F01D 21/003
10,790,056 B1 * 9/2020 Accomazzi ........... G06T 7/0002
(Continued)

FOREIGN PATENT DOCUMENTS

JP 2010223932 A 10/2010
WO 2020012564 A1 1/2020

OTHER PUBLICATIONS

International Search Report and Written Opinion received for PCT Application No. PCT/US2021/072018, dated Feb. 15, 2022, 11 pages.

*Primary Examiner* — Richard A Hansell, Jr.
(74) *Attorney, Agent, or Firm* — Mintz Levin Cohn Ferris Glovsky and Popeo, PC; Lisa Adams

(57) ABSTRACT

A method of adaptive inspection includes receiving data characterizing one or more images of an inspection region of an industrial machine acquired by an inspection system operating based on a first set of operating parameters. The inspection region includes a site feature. The method also includes determining, by an analytical model, one or more characteristics of the inspection region from the received data characterizing the one or more images of the inspection region. The method further includes generating a control signal based on the one or more characteristics of the inspection region and/or a user input. The inspection system is configured to perform a new inspection of the inspection region based on the control signal.

34 Claims, 3 Drawing Sheets

(51) Int. Cl.
*G06T 7/00* (2017.01)
*H04N 5/225* (2006.01)

(52) U.S. Cl.
CPC .............. *G06T 2207/30164* (2013.01); *H04N 2005/2255* (2013.01)

(56) References Cited

U.S. PATENT DOCUMENTS

| | | | |
|---|---|---|---|
| 2006/0065844 A1* | 3/2006 | Zelakiewicz | H04N 5/232 |
| | | | 348/E5.042 |
| 2008/0015569 A1* | 1/2008 | Saadat | A61B 1/00082 |
| | | | 606/41 |
| 2011/0026805 A1 | 2/2011 | Hori | |
| 2013/0169196 A1* | 7/2013 | Markham | H02P 6/08 |
| | | | 318/3 |
| 2016/0314571 A1* | 10/2016 | Finn | G06F 16/40 |
| 2018/0095263 A1 | 4/2018 | Ward et al. | |
| 2018/0158223 A1 | 6/2018 | Kobayashi | |
| 2018/0218196 A1* | 8/2018 | Chhabra | G06V 10/955 |
| 2019/0271962 A1* | 9/2019 | Miyata | G05B 19/41875 |
| 2019/0294883 A1* | 9/2019 | Pathak | G06K 9/627 |

* cited by examiner

ADAPTIVE BORESCOPE INSPECTION

BACKGROUND

Video inspection devices, such as video endoscopes or borescopes, can be used to take depth measurements on an object (e.g., lowest points in anomalies such as pits or dents, heights of welds, measurements of offsets or clearances between surfaces, etc.). Additionally, video inspection devices can be used to observe defects (e.g., tears, cracks, scratches, etc.) on a surface of an object (e.g., an industrial machine). In many instances, the surface of the object is inaccessible and cannot be viewed without the use of the video inspection device. For example, a video inspection device can be used to inspect the surface of a blade of a turbine engine on an aircraft or power generation unit to identify any anomalies to determine if any repair or further maintenance is required. In order to make that assessment, it is often necessary to obtain highly accurate-dimensional measurements of the surface to verify that the anomaly does not fall outside an operational limit or required specification for that object.

SUMMARY

Various aspects of the disclosed subject matter may provide one or more of the following capabilities.

In one implementation, a method includes receiving data characterizing one or more images of an inspection region of an industrial machine acquired by an inspection system operating based on a first set of operating parameters. The inspection region includes a site feature. The method also includes determining, by an analytical model, one or more characteristics of the inspection region from the received data characterizing the one or more images of the inspection region. The method further includes generating a control signal based on the one or more characteristics of the inspection region and/or a user input. The inspection system is configured to perform a new inspection of the inspection region based on the control signal.

One or more of the following features can be included in any feasible combination.

In one implementation, determining one or more characteristic includes one or more of determining an identity of the site feature by an image recognition algorithm in the analytical model. The image recognition algorithm receives data characterizing the one or more images of the inspection region and historical images of inspection region as inputs; determining image quality characteristics of the image of the inspection region. The image quality characteristics include one or more of resolution of the image, illumination of the site feature in the image, size of an image of the site feature relative to the size of the image of the inspection region; and determining site feature characteristics including one or more of size, shape, and depth of the site feature. In another implementation, the site feature is a site defect in the inspection region of the industrial machine. Identifying the site feature includes determining a defect type associated with the site defect.

In one implementation, the method further includes determining that the new inspection of the inspection region includes acquiring a new image. The determining is based on the identity of the site feature and/or image quality characteristics of the image of the inspection region. The method also includes determining a new set of operating parameters associated with the inspection system for the acquisition of the new image. The control signal is based on the new set of operating parameters.

In one implementation, the determination of acquiring a new image is based on comparing the image quality characteristics with predetermined image quality characteristics comprising one or more of a predetermined image resolution, a predetermined image illumination, a predetermined ratio of size of the image of the site feature relative to the size of the image of the inspection region. In another implementation, the control signal is configured to vary at least one of a position of a lighting device, an orientation of the lighting device and an intensity associated with the lighting device in the inspection system to a new position, a new orientation, and a new intensity, respectively. The new set operating parameters include at least one of the new position, the new orientation and the new intensity.

In one implementation, the control signal is configured to vary at least one of a position of a lighting device, an orientation of the lighting device and an intensity associated with the lighting device in the inspection system to a new position, a new orientation, and a new intensity, respectively. The new set operating parameters include at least one of the new position, the new orientation and the new intensity.

In one implementation, the new image is a high-fidelity image, and the determination of acquiring a new image is based on comparing the identity of the site feature with a predetermined list of site features requiring high-resolution images. In another implementation, the high-fidelity image can include one or more of a high-resolution image, a stereoscopic image, a panoramic image, a high-dynamic range image, a 3D point cloud image, a flash mode image, and a live image. In yet another implementation, the control signal is configured to activate a high-resolution camera in the inspection system to capture the new image. In another implementation, the control signal is configured to activate one or more cameras in the inspection system to capture multiple images. The captured multiple images are used to generate one or more of the panoramic image, the stereoscopic image and the 3D point cloud image.

In one implementation, the method further includes determining that the new inspection of the inspection region includes acquiring a video of the inspection region, the determining based on comparing the identity of the site feature with a predetermined list of site features requiring videos. In another implementation, the control signal is configured to activate a video camera in the inspection system to capture a video.

In one implementation, the method includes determining that the new inspection of the inspection region includes acquiring multiple images of the inspection region during a predetermined time period; and determining a new set of operating parameters associated with a turning tool of the inspection system. The turning tool is coupled to the inspection region and is configured to move the inspection region. In another implementation, the control signal is configured to vary a state of the turning tool. The control signal is based on the new set of operating parameters. In yet another implementation, the control signal is configured to vary a speed of rotation associated with the turning tool and the inspection region relative to the camera. In another implementation, the control signal is configured to move the turning tool back and forth resulting in a back and forth motion of the inspection region relative to the camera. In another implementation, the control signal is configured to move the turning tool such that the resulting motion of the inspection region matches a motion of the camera.

In one implementation, the method further includes generating a data file comprising one or more of data characterizing the one or more images of an inspection region, the one or more characteristics of the inspection region, the identity of the site feature, image quality characteristics, site feature characteristics, and the new set of operating parameters.

In one implementation, the method further includes generating a notification including one or more of data characterizing the one or more images of an inspection region, the one or more characteristics of the inspection region, the identity of the site feature, image quality characteristics, site feature characteristics, and the new set of operating parameters. In another implementation, the method further includes presenting the notification to a user; receiving an input from the user in response to the presented notification; and generating the control signal based on the received input. The new inspection of the inspection region by the inspection system is based on the control signal.

In one implementation, the control signal can be configured to vary at least one of a position and an orientation of a camera in the inspection system to a new position and a new orientation, respectively. The new set operating parameters include values for at least one of the new position and the new orientation. In another implementation, the control signal is configured to vary at least one of a position of a lighting device, an orientation of a lighting device and an intensity associated with the lighting device in the inspection system to a new position, a new orientation and a new intensity, respectively. The new set operating parameters include at least one of the new position and the new orientation. In yet another implementation, the control signal is configured to activate a high-resolution camera in the inspection system to capture a new image.

In one implementation, the method further includes determining that the new inspection of the inspection region includes acquiring a video of the inspection region, the determining based on comparing the identity of the site feature with a predetermined list of site features requiring videos. The notification includes a recommendation for acquiring the video of the inspection region. In another implementation, the input from the user includes data characterizing acceptance of the recommendation for acquiring the view. The control signal is configured to activate a video camera in the inspection system to capture the video.

In one implementation, the method includes determining that the new inspection of the inspection region includes acquiring multiple images of the inspection region during a predetermined time period. The method also includes determining a new set of operating parameters associated with a turning tool of the inspection system. The turning tool is coupled to the inspection region and is configured to move the inspection region, and the notification includes a recommendation for acquiring the multiple images of the inspection region and the new set of operating parameters associated with the turning tool. In another implementation, the input from the user includes data characterizing acceptance of the recommendation for acquiring the multiple images.

In one implementation, the control signal is configured vary a state of the turning tool. The control signal is based on the new set of operating parameters. In another implementation, the control signal is configured to vary a speed of rotation associated with the turning tool and the inspection region relative to the camera. In yet another implementation, the control signal is configured to move the turning tool back and forth resulting in a back and forth motion of the inspection region relative to the camera. In one implementation, the control signal is configured to move the turning tool such that the resulting motion of the inspection region matches a motion of the camera. In another implementation, the data characterizing the one or more images is associated with a video of the inspection region.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Figure 1:
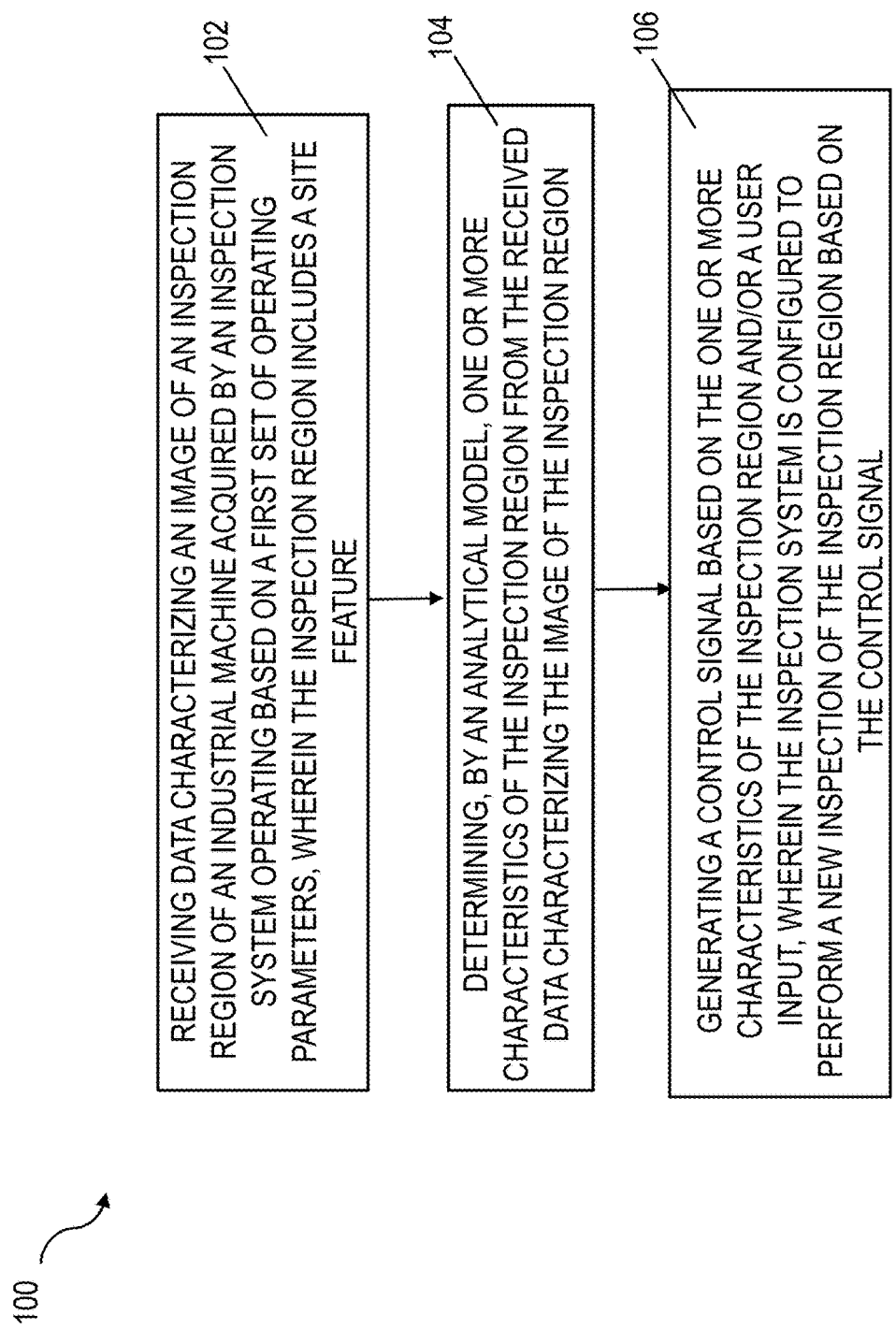
FIG. 1 illustrates a flowchart of an exemplary method for inspection of an inspection site.

Inspection systems (e.g., systems including borescope and/or turning tools) are commonly employed to inspect industrial machine (e.g., power generation equipment, oil and gas equipment, aircraft equipment, manufacturing equipment, and the like). The inspection data generated from the inspection can be presented to a human operator for analysis. In some cases, the data analysis can occur after the inspection has been completed. As a result, if the inspection data is found to be erroneous or insufficient (e.g., when a defect in the industrial machine cannot be accurately identified), additional inspection may need to be performed (e.g., the previous inspection may need to be repeated). This process can be cumbersome and inefficient. Moreover, the time delay between the two inspections can be undesirable (e.g., when a defect that threatens the integrity of the industrial machine is not detected during the first inspection). Furthermore, analysis by the human operator (e.g., based on his/her experience) can be slow, error prone and inconsistent. This application describes systems and methods for analyzing the inspection data (e.g., in real-time), and adapting the inspection based on the analysis. For example, the inspection data can be analyzed and a new inspection step can be determined and/or executed based on the analysis. Additionally or alternatively, a human operator can be guided during the inspection process (e.g., by presentation of the inspection data and/or the data analysis). For example, a notification can be generated that can alert the human operator (e.g., in real time) if a need for additional inspection arises FIG. 1 illustrates a flowchart of an exemplary method for inspecting an inspection site (e.g., an industrial machine). At step 102, data characterizing an image of an inspection region of an industrial machine can be received (e.g., by a controller of the inspection system). The received data can be acquired by an inspection system operating based on a set of operating parameters (e.g., predetermined operating parameters) and configured to inspect the inspection region of the industrial machine. The inspection system can include, for example, an inspection device (e.g., a borescope), a turning tool configured to move the inspection region relative to the inspection device, a controller, etc. The inspection region can include one or more site features (e.g., one or more defects in the industrial machine, a predetermined target feature, etc.). The operating parameters can include, for example, positions and articulation angles of camera(s) in the inspection device, arrangement of lighting device(s) during the capture of image(s) by the camera(s), the type of data to be captured (e.g., 2D image, 3D image, raw or compressed video, geometrically accurate image for dimensioning of features), etc. The inspection device can operate on the set of operating parameters during the acquisition of the image of the inspection region.

Figure 2:
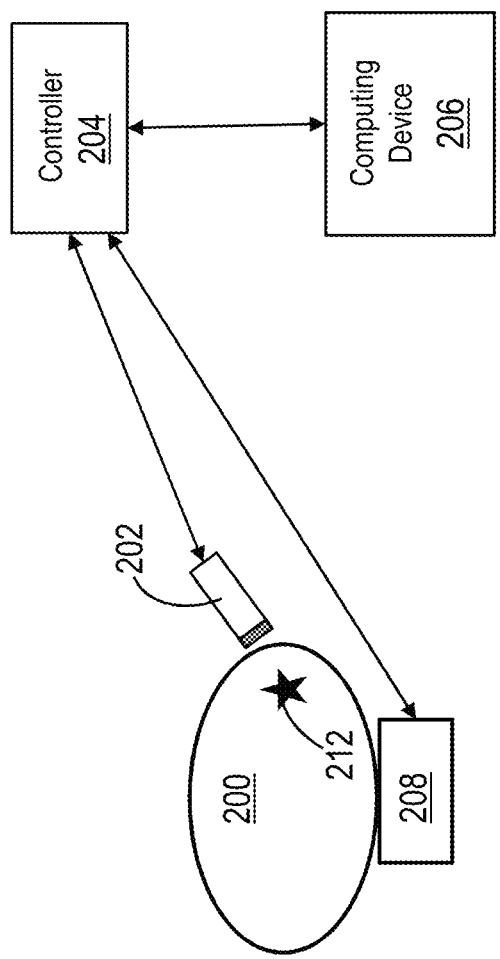
FIG. 2 illustrates an exemplary inspection system configured to inspect the inspection site.

FIG. 2 illustrates an exemplary inspection site 200 that can be inspected by an inspection system including an inspection device 202 (e.g., a borescope) and/or a turning tool 208. The inspection device 202 can be communicatively coupled to a controller 204 that can control the operation of the inspection device 202 and/or the turning tool 208. The controller 204 can generate control signals that drive the operation of the inspection device 202 and/or turning tool 208. For example, based on the control signal, the inspection device 202 can inspect a site feature 212 in an inspection region of the inspection site 200. Additionally or alternatively, the control signal can instruct the turning tool 208 to move the inspection site 200 or a portion thereof during or prior to the inspection. For example, the inspection site 200 or a portion thereof can be immovably coupled to the turning tool 208. As the turning tool 208 moves (e.g., rotational motion, translational motion or a combination thereof), the inspection site 200 or a portion thereof can move.

In some implementations, the operations of the inspection device 202 and the turning tool 208 can be coordinated. For example, a first control signal can instruct the turning tool 208 to place the inspection site 200 (or a portion thereof) in a predetermined position and/or orientation (e.g., relative to the inspection device 202); and a second control signal can instruct the inspection device to perform an inspection (e.g., acquire an image and/or video) when the inspection site (or a portion thereof) is in the predetermined position and/or orientation. This process can be repeated resulting in inspection of the device in multiple positions/orientation.

The controller 204 can also receive inspection data from the inspection device 202. The received data can include characteristic of properties of the inspection site 200 (e.g. temperature, humidity, etc.), acquired images, acquired videos, etc. The inspection data can be presented on a display screen on the controller 204, or can be transmitted to the computing device 206 (where it can be displayed and/or analyzed). In some implementations, the controller 204 can include a display screen where the inspection data, operating parameters of the inspection system, etc., can be displayed.

Returning to FIG. 1, at step 104, one or more characteristics of the inspection region can be determined from the received data characterizing the image of the inspection region received at step 102 (e.g., by an analytical model). In some implementations, an identity of the site feature in the inspection region can be determined. An image recognition algorithm (e.g., in the analytical model) can identify the site feature from the image of the inspection region. The image recognition algorithm can be trained on training data including images of multiple site features in multiple inspection regions (e.g., different types of defects in multiple industrial machines). For example, the training data can include images of defects (e.g. crack, tear, rub, dent, coating loss, missing material, erosion, excess material, a fissure, or a combination thereof) in industrial machines (e.g., turbines, automotive engines, heat exchangers, industrial piping, etc.). In some implementations, a previously trained image recognition algorithm can be stored in a memory device accessible to the controller (e.g., controller 204). In other implementations, the image recognition algorithm can be continuously trained during the inspection process (e.g., by using the inspection data as training data). The image recognition algorithm can identify the site feature (e.g., "defect type"). For example, the defect can be identified as one of a crack, tear, rub, dent, coating loss, missing material, erosion, excess material, a fissure, or a combination thereof. In some implementations, the determined characteristic can include image acquisition parameters associated with the inspection of the inspection region (e.g., lighting, sharpness, brightness, dirty lenses, overly-oblique angles, vibration/motion, etc.).

In some implementations, image quality characteristics of the image of the inspection region can be determined. The image quality characteristics can include a resolution of the image. The image quality characteristics can depend on the type of inspection device used to acquire the image, location/orientation of the inspection device, location/orientation of lighting instrument used to illuminate the inspection region during the acquisition of the image, etc. For example, the analytical model can determine if the acquired image has desirable resolution. This can be done, for example, by determining the number of pixels per unit area of the image or a portion thereof (e.g., portion that includes the image of the site feature). Additionally or alternatively, resolution of the image can be determined based on known characteristics of the camera in the inspection device (e.g., on the resolution of the camera).

The image quality characteristic can include properties of the image of the site feature. For example, the analytical model can determine the size of the image of the site feature relative to the size of the image of the inspection region (e.g., a ratio between them). This can be done, for example, by identifying the site feature in the image of the inspection region (by the image recognition algorithm). For example, the image recognition algorithm can identify the contours of the site feature (e.g., indicative of shape of the site feature) in the image of the inspection region, and calculate a size metric representative of the size of the site feature in the image (e.g., a size metric based on the length/width of the size feature). The size metric of the site feature can be compared to the size of the image of the inspection region (e.g., by calculating a ratio between the two). The analytical model may determine a depth of the site feature (e.g., depth of a crack). The analytical model may generate a modified image of the inspection region where the site features are identified (e.g., by superposing a marker on the site feature). Additionally, a text box including the site feature type (e.g., defect type) can be placed adjacent to the image of the site feature. The image quality characteristic can include brightness of the inspection region image (e.g., based on illumination of the inspection region). The illumination of the inspection region can be based on location/orientation of lighting instrument used to illuminate the inspection region during the acquisition of the image. In some implementations, the determined characteristic can include the surrounding (or environment) of the site feature. For example, the site feature can be located on/adjacent to a machine part (e.g., a turbine). The determined characteristic can be the identity of the machine part(s) that can be determined by the analytical model.

At step 106, a control signal can be generated (e.g., by the controller of the inspection system). The control signal can be generated based on one or more characteristics determined at step 104 and/or based on a user input (e.g., provided via computing device 206, provided via a display screen in the controller 204). The control signal that can instruct the industrial machine to perform a new inspection of the inspection region. The control signal can include the operating parameters based on which the new inspection needs to be performed. The new inspection can include, for example, acquiring a new image (or multiple new images) of the inspection region (e.g., a high-resolution image, a zoomed-in image, a zoomed-out image, an image from a different perspective, an image having a different illumination, etc.). Additionally or alternately, the new inspection can include acquiring a video of the inspection region. In some implementations, the new inspection can include stopping the inspection process (e.g., stopping the turning tool, switching off the inspection device, or a combination thereof).

In some implementations, the determination that a new inspection of the inspection region needs to be performed can be based on comparison of the characteristics of the inspection region determined at step 104 with predetermined inspection constraints. The predetermined inspection constraints can include predetermined defect type, predetermined image quality characteristics (e.g., predetermined image resolution, a predetermined image illumination, a predetermined ratio of size of the image of the site feature relative to the size of the image of the inspection region, etc.). The new inspection of the inspection region can be based on correlation between the characteristics determined at step 104 and the predetermined constraints. The correlation can be indicative of how similar the characteristics are to the predetermined constraints. If the corresponding characteristics obtained from the inspection measurement data are within a predetermined range from the predetermined constraints, the characteristic of the received measurement data can be considered to correlate with the predetermined constraints.

The predetermined constraints can include constraints associated with the image of the inspection region/site feature in the inspection region (e.g., image resolution, image brightness, size of the site feature in the image, etc.). In some implementations, the predetermined constraints can indicate a type of defect. The analytical model can determine that the site feature is a defect and can assign a characteristic identifier that can indicate the defect type. If the characteristic identifier is similar to a constraint characteristic identifier in the predetermined constraints, the received measurement data can be considered to correlate with the predetermined constraints.

The control signal can instruct the inspection system (e.g., inspection device, turning tool, or a combination thereof) to execute the new inspection. The control signal can include a new set of operating parameters for the inspection system. Upon receipt of the control signal, the inspection system can perform the new inspection by operating based on the new set of operating parameters. The control signal can be generated, for the controller (e.g., controller 204) and can be transmitted to the inspection system. In some implementations, the inspection device of the inspection system can include a probe driver that can move one or more portions of the inspection device based on the control signal (e.g., as described in FIG. 3). One or more motors in the inspection device can vary the position/orientation of the inspection device (or a portion thereof) to allow for inspection of the site feature. For example, a head section of the inspection device can be positioned adjacent to the site feature (e.g., by translation/rotation of the head section). The head section can include one or more sensors (e.g., IR camera, visible-light camera, vibration detectors, temperature sensors, etc.), and light sources that can allow for inspection of the site feature. Details of an exemplary inspection device (a borescope) are provided below with the description of FIG. 3.

In some implementations, the new inspection of the inspection region can include acquiring a new image. For example, if the image quality characteristics do not correlate with predetermined image quality constraints (e.g., predetermined image resolution, predetermined image brightness, predetermined size of image of the site feature in inspection region image, etc.), it can be determined that a new image of the inspection region should be acquired by the inspection device. Additionally or alternately, the identity of the site feature (e.g., defect type) can correlate with a predetermined site feature type that requires a new image (e.g., a site feature that requires a high-fidelity image). The controller can determine the new set of operating parameters associated with the acquisition of the new image. The operating parameters can include position/orientation of the camera(s) and/or lighting instruments in the inspection device (e.g., when the acquired image of the site feature was not captured from a desired perspective, not captured with a desired illumination, etc.). The new image can be acquired by moving/orienting the camera(s) and/or lighting instrument(s) based on the aforementioned operating parameters (e.g., communicated to the inspection device via the control signal).

In some implementations, the new set of operating parameters can include focus values for the camera (e.g., when the ratio of the size of the image of the site feature and the size of the image of the inspection region does not have a desired value, when the acquired image is blurred, etc.). The new image can be acquired by zooming in the camera (e.g., when the ratio is below a low threshold value) or by zooming out the camera (e.g., when the ratio is above a high threshold value or when the image of the entire site feature is not captured). Additionally or alternately, the new image can be acquired by moving the camera towards the site feature or moving the camera away from the site feature.

In some implementations, it can be determined that the new inspection can include capturing one or more high-fidelity image. In one implementation, high-fidelity image can include a high-resolution image of the inspection region (e.g., when the identified site feature correlates with one of the site features in a predetermined list of site features requiring high-resolution images). The control signal can activate a high-resolution camera in the inspection device and instruct it to acquire a high-resolution image. In some implementations, the high-fidelity image can include a panoramic image (e.g., generated by capturing multiple images of the inspection region and combining the images to for a panoramic image). The control signal can instruct one more cameras in the inspection device to capture multiple images and transmit data characterizing the images to the controller. The controller can combine the images to generate the panoramic image. In some implementations, the controller can combine the images to form a 3D point cloud image. In some implementations, the high-fidelity image can include one or more of a stereoscopic image, a high-dynamic range image and a live photo.

In some implementations, it can be determined that the new inspection can include recording a video of the site feature (e.g., when the identified site feature correlates with one of the site features in a predetermined list of site features requiring a video). The control signal can activate a video camera in the inspection device. The video camera can be activate for a predetermined period(s) of time (e.g., to periodically capture the video of a moving machine part).

In some implementations, it can be determined that the new inspection can include acquiring multiple images of the inspection region (e.g., during a predetermined time period). For example, the various images can be captured by moving the inspection region relative to the inspection device, and capturing the video for various locations/orientations of the inspection region (e.g., relative to the inspection device). In some implementations, the new set of operating parameters can be associated with a state of the turning tool (e.g., turning tool 208) and/or motion of the inspection device (e.g., inspection device 202). The state of the turning tool can be indicative of the motion of the turning tool. For example, the turning tool can be stationary, translating/rotating with a constant velocity/angular velocity, rotating back and forth, translating back and forth, etc. If the turning tool is immovably coupled to the inspection region or a portion thereof (e.g., to a turbine blade of an engine), the inspection region can follow the motion of the turning tool. In one implementation, based on the control signal to the turning tool and/or the inspection device, the motion of the inspection device can match the motion of the inspection region. This can allow for acquisition of multiple images of a moving inspection region (e.g., a turbine blade) from a fixed perspective (e.g., during a predetermined time period). In some implementations, the control signal can vary the angular/translational velocity of the turning tool/inspection region relative to the inspection device.

In some implementations, the control signal can be generated based on a user input (e.g., provided via the computing device 206, via a display screen in the controller 204, etc.). For example, a notification including one or more of data characterizing an image of an inspection region, the one or more characteristics of the inspection region, the identity of the site feature, image quality characteristics, site feature characteristics, and recommendation for the new inspection (e.g., based on the new set of operating parameters), etc., can be generated. The notification can be presented to a user who can review the notification and provide an input. The input from the user can include an approval for the execution of the new inspection (e.g., based on the new set of operating parameters). Alternately, the user can make changes to the new inspection (e.g., by changing one or more of the new set of operating parameters). The user input can be received (e.g., by the controller 204), and the control signal can be generated based on the user input (e.g., based on the new set of operating parameter, based on revised operating parameters provided by the user, etc.). Based on the user input, a control signal can be generated. The control signal can include the new set of operating parameters and/or modifications to the new set of operating parameters (e.g., based on user input). The inspection system can perform a new inspection based on the control signal as described above (e.g., vary at least one of a position and an orientation of a camera/lighting device in the inspection system to a new position/a new orientation; activate a high-resolution camera to acquire a high-resolution image, activate one or more cameras to capture multiple images to generate a panoramic image/3D point cloud image, activate a video camera, acquire multiple images by varying relative motion between the inspection region and the inspection device, etc.).

In some implementations, the notification can include an inspection summary that can include data characterizing the image received at step 102, the characteristics of the inspection region determined at step 104, the new inspection including the new operating parameters, etc. The notification can include modified images of the inspection region that include image analysis information (e.g., markers around site features, inspection data, etc.) The notification can be provided to an operator/user. This can be done, for example, via a GUI display space in a computing device (e.g., a laptop, a tablet, computing device 206, controller 204, etc.). The notification can provide an option to the user to save one or more of the inspection data associated with the site feature, operating parameters/constraints of the inspection device associated with the inspection of the site feature, and additional notes. Upon receiving instructions from the user, a data file including the aforementioned data can be generated and saved (e.g., in a database in controller 204, computing device 206, cloud database, etc.). The data file can include one or more of data characterizing the one or more images of the inspection region, the one or more characteristics of the inspection region, the identity of the site feature, image quality characteristics, site feature characteristics, and the new set of operating parameters. The generated data file can be linked to the site feature (e.g., as an icon with an indication of the site feature), and can be provided to a user during the inspection. For example, the data file can be presented as an icon in the GUI display space. The user can access the data file by clicking on the icon.

In some implementations, the notification can include the recommendation for acquiring the video of the inspection region (e.g., which can be determined based on comparison between the identity of the site feature with a predetermined list of site features requiring videos). In some implementations, the notification can include a recommendation for acquiring multiple images of the inspection region and the new set of operating parameters associated with the turning tool. As described above, the control signal can be generated based on the input provided by the user in response to the recommendation in the notification.

Figure 3:
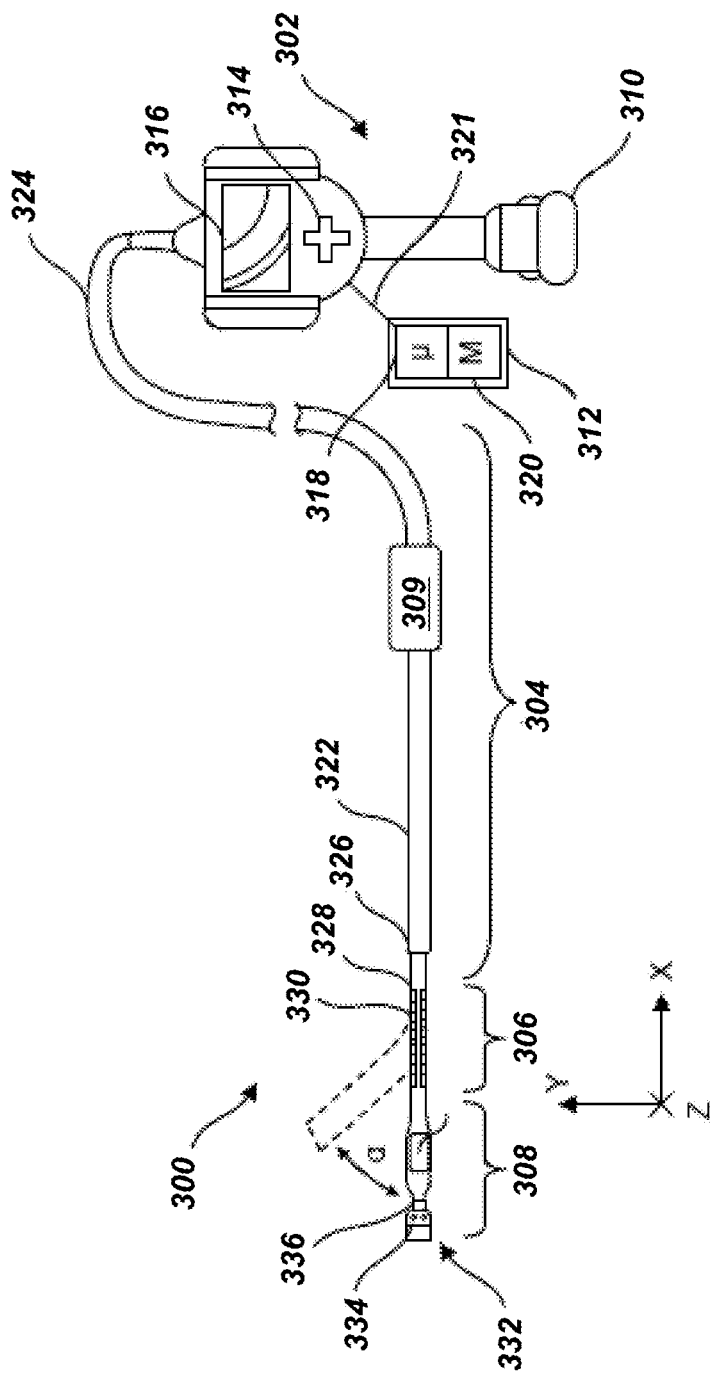
FIG. 3 illustrates a diagram illustrating an exemplary embodiment of a nondestructive testing (NDT) device.

FIG. 3 is a diagram illustrating an exemplary embodiment of an inspection device (e.g., a non-destructive device) in the form of a borescope 300. The borescope 300 can include a control unit 302 (or controller 204), a conduit section 304, a bendable articulation section 306, and a head section 308. In one embodiment, the sections 304, 306, 308 can have different lengths and can be integral with one another, or can be detachable from one another. As depicted, the conduit section 304 is suitable for insertion into a variety of different targets, such as inside turbomachinery, equipment, pipes, conduits, underwater locations, curves, bends, inside or outside of an aircraft system, and the like.

The borescope 300 can include a probe driver 309 coupled to the conduit section 304. The probe driver 309 can include a motor (not shown) configured to translate and/or rotate one or more of the sections 304, 306, 308 (e.g., to facilitate insertion of the probe head 308 into the target). Additionally or alternatively, orientation/position of a portion of the head section 308 (e.g., camera, light source, etc.) can be varied to acquire an inspection region image (e.g., RGB image, IR image, etc.). The control unit 302 can include a control unit housing 310, a controller 312, a directional input 314, and a screen 316. The controller 312 can include a processor 318 and a readable memory 320 containing computer readable instructions which can be executed by the processor 318 in order to actuate the borescope 300. The computer readable instructions can include an inspection plan based on which the borescope 300 or a portion thereof (e.g., a conduit section 304, a bendable articulation section 306, and a head section 308) can be translated/rotated (e.g., by the probe driver 309). In some implementations, the operation of the probe driver 309 can be based on a control signal (e.g., generated by the controller 204 based on the inspection plan/user input via GUI display space on screen 316 or a computing device, etc.).

The controller 312 can be communicatively coupled to the control unit 302 via one or more signals 321. The controller 312 can also be arranged within the control unit housing 310, or can be arranged outside the control unit housing 310. On some implementations, the directional input 314 can be configured to receive user input (e.g., direction controls) to the control unit 302 for actuation of the borescope 300. The screen 316 can display visual information being received by the camera (comprising an optical sensor) arranged in the head section 308, which can allow the user to better guide the borescope 300 using the directional input 314. The directional input 314 and the screen 316 can be communicatively coupled to the controller 312 via the one or more signals 321, which can be a hard-wired connection or a wireless signal, such as WI-FI or Bluetooth. In one implementation, inspection data and/or notifications (e.g., notifications based on inspection data as described above) can be provided on the screen 316.

The conduit section 304 can include a tubular housing 322 including a proximal end 324 and a distal end 326. The tubular housing 322 can be a flexible member along its whole length, or can be rigid at the proximal end 324 and become more flexible travelling down the length of the conduit section 304 towards the distal end 326. In certain embodiments, the tubular housing 322 can be formed from a non-porous material to prevent contaminants from entering the borescope 300 via the conduit section 304.

The control unit 302 can be arranged at the proximal end 324 of the tubular housing 322, and the bendable articulation section 306 can be arranged at the distal end of the tubular housing 322. The bendable articulation section 306 can include a bendable neck 328 and washers 330. The bendable neck 328 can be arranged at the distal end 326 of the tubular housing 322, and is able to be actuated 360° in the Y-Z plane. The bendable neck 328 can be wrapped in a non-porous material to prevent contaminants from entering the borescope 300 via the bendable articulation section 306.

The head section 308 can include a head assembly 332. The head assembly 332 can include one or more light source 334 (e.g., LEDs or a fiber optic bundle with lights at the proximal end), a camera 336 (or multiple cameras such as visible-light camera, IR camera, etc.), and one or more sensors 338 that can be configured to collect data about the surrounding environment. The camera 336 of the borescope 300 can provide images and video suitable for inspection to the screen 316 of the control unit 302. The light source 334 can be used to provide for illumination when the head section 308 is disposed in locations having low light or no light. The sensor 338 can record data including temperature data, distance data, clearance data (e.g., distance between a rotating element and a stationary element), flow data, and so on.

In certain embodiments, the borescope 300 includes a plurality of replacement head assemblies 332. The head assemblies 332 can include tips having differing optical characteristics, such as focal length, stereoscopic views, 3-dimensional (3D) phase views, shadow views, etc. Additionally or alternatively, the head section 308 can include a removable and replaceable portion of the head section 308. Accordingly, a plurality of the head sections 308, bendable necks 328, and conduit section 304 can be provided at a variety of diameters from approximately one millimeter to ten millimeters or more.

During use, the bendable articulation section 306 and the probe driver 309 can be controlled, for example, by the control inputs (e.g., relative control gestures, physical manipulation device) from the directional input 314 and/or control signals generated by the controller 312. The directional input can be a joystick, D-pad, touch pad, trackball, optical sensor, or a touchscreen over the screen 316. The directional input 314 can also be a similar device that is located outside the control unit housing 310 and connected by wire or wireless means. In particular, a set of control inputs can be used to control the bendable articulation section 306 and/or the probe driver 309. The bendable articulation section 306 can steer or "bend" in various dimensions, while the conduit section 304 can translate and/or rotate, using any combination of actuators and wires arranged within the control unit 302, to adjust the orientation (e.g., a positioning) of the head section 308. In some implementations, the control inputs/direction input 314 can be generated by the controller based on the inspection plan.

The actuators can be electric, pneumatic, or ultrasonically operated motors or solenoids, shape alloy, electroactive polymers, dielectric elastomers, polymer muscle material, or other materials. For example, the bendable articulation section 306 and the probe driver 309 can enable movement of the head section 308 in an X-Y plane, X-Z plane, and/or Y-Z plane. Indeed, the directional input 314 can be used to perform control actions suitable for disposing the head section 308 at a variety of angles, such as the depicted angle α. In this manner, the head section 308 can be positioned to visually inspect desired locations.

Once the head section 308 is in a desired position, the camera 336 can operate to acquire, for example, a stand-still visual image or a continuous visual image, which can be displayed on the screen 316 of the control unit 302, and can be recorded by the borescope 300. In embodiments, the screen 316 can be multi-touch touch screens using capacitance techniques, resistive techniques, infrared grid techniques, and the like, to detect the touch of a stylus and/or one or more human fingers. Additionally or alternatively, acquired visual images can be transmitted into a separate storage device for later reference.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
receiving data characterizing one or more images of an inspection region of an industrial machine acquired by an inspection system operating based on a first set of operating parameters, wherein the inspection region includes a site feature;
determining, by an analytical model, one or more characteristics of the inspection region from the received data characterizing the one or more images of the inspection region; and
generating a control signal based on the one or more characteristics of the inspection region, wherein the inspection system is configured to perform a new inspection of the inspection region based on the control signal,
wherein the control signal is configured to activate one or more cameras in the inspection system to capture multiple images, wherein the captured multiple images are used to generate one or more of a panoramic image, a stereoscopic image and a 3D point cloud image.

2. The method of claim 1 wherein determining one or more characteristic includes one or more of:
determining an identity of the site feature by an image recognition algorithm in the analytical model, wherein the image recognition algorithm receives data characterizing the one or more images of the inspection region and historical images of inspection region as inputs;
determining image quality characteristics of the image of the inspection region, wherein the image quality characteristics include one or more of resolution of the image, illumination of the site feature in the image, size of an image of the site feature relative to the size of the image of the inspection region; and
determining site feature characteristics including one or more of size, shape, and depth of the site feature.

3. The method of claim 2, wherein the site feature is a site defect in the inspection region of the industrial machine, wherein identifying the site feature includes determining a defect type associated with the site defect.

4. The method of claim 2, further comprising:
determining that the new inspection of the inspection region includes acquiring a new image, the determining based on the identity of the site feature and/or image quality characteristics of the image of the inspection region; and
determining a new set of operating parameters associated with the inspection system for the acquisition of the new image, wherein the control signal is based on the new set of operating parameters.

5. The method of claim 4, wherein the determination of acquiring a new image is based on
comparing the image quality characteristics with predetermined image quality characteristics comprising one or more of a predetermined image resolution, a predetermined image illumination, a predetermined ratio of size of the image of the site feature relative to the size of the image of the inspection region.

6. The method of claim 5, wherein the control signal is configured to vary at least one of a position and an orientation of a camera in the inspection system to a new position and a new orientation, respectively, wherein the new set operating parameters include values for at least one of the new position and the new orientation.

7. The method of claim 5, wherein the control signal is configured to vary at least one of a position of a lighting device, an orientation of the lighting device and an intensity associated with the lighting device in the inspection system to a new position, a new orientation, and a new intensity, respectively, wherein the new set operating parameters include at least one of the new position, the new orientation and the new intensity.

8. The method of claim 4, wherein the new image is a high-fidelity image, and wherein the determination of acquiring a new image is based on comparing the identity of the site feature with a predetermined list of site features requiring high-resolution images.

9. The method of claim 8, wherein the high-fidelity image can include one or more of a high-resolution image, the stereoscopic image, the panoramic image, a high-dynamic range image, the 3D point cloud image, a flash mode image, and a live image.

10. The method of claim 9, wherein the control signal is configured to activate a high-resolution camera in the inspection system to capture the new image.

11. The method of claim 2, further comprising:
determining that the new inspection of the inspection region includes acquiring a video of the inspection region, the determining based on comparing the identity of the site feature with a predetermined list of site features requiring videos.

12. The method of claim 11, wherein the control signal is configured to activate a video camera in the inspection system to capture a video.

13. The method of claim 2, further comprising:
determining that the new inspection of the inspection region includes acquiring multiple images of the inspection region during a predetermined time period; and
determining a new set of operating parameters associated with a turning tool of the inspection system, wherein the turning tool is coupled to the inspection region and is configured to move the inspection region.

14. The method of claim 13, wherein the control signal is configured to vary a state of the turning tool, wherein the control signal is based on the new set of operating parameters.

15. The method of claim 14, wherein the control signal is configured to vary a speed of rotation associated with the turning tool and the inspection region relative to the camera.

16. The method of claim 14, wherein the control signal is configured to move the turning tool back and forth resulting in a back and forth motion of the inspection region relative to the camera.

17. The method of claim 14, wherein the control signal is configured to move the turning tool such that the resulting motion of the inspection region matches a motion of the camera.

18. The method of claim 4, further comprising generating a data file comprising one or more of data characterizing the one or more images of an inspection region, the one or more characteristics of the inspection region, the identity of the site feature, image quality characteristics, site feature characteristics, and the new set of operating parameters.

19. The method of claim 4, further comprising:
generating a notification including one or more of data characterizing the one or more images of an inspection region, the one or more characteristics of the inspection region, the identity of the site feature, image quality characteristics, site feature characteristics, and the new set of operating parameters.

20. The method of claim 19, further comprising:
presenting the notification to a user;
receiving an input from the user in response to the presented notification;
generating the control signal based on the received input, wherein the new inspection of the inspection region by the inspection system is based on the control signal.

21. The method of claim 20, wherein the control signal is configured to vary at least one of a position and an orientation of a camera in the inspection system to a new position and a new orientation, respectively, wherein the new set operating parameters include values for at least one of the new position and the new orientation.

22. The method of claim 20, wherein the control signal is configured to vary at least one of a position of a lighting device, an orientation of the lighting device and an intensity associated with the lighting device in the inspection system to a new position, a new orientation, and a new intensity, respectively, wherein the new set operating parameters include at least one of the new position, the new orientation and the new intensity.

23. The method of claim 20, wherein the control signal is configured to activate a high-resolution camera in the inspection system to capture a new image.

24. The method of claim 20, further comprising determining that the new inspection of the inspection region includes acquiring a video of the inspection region, the determining based on comparing the identity of the site feature with a predetermined list of site features requiring videos, wherein the notification includes a recommendation for acquiring the video of the inspection region.

25. The method of claim 24, wherein the input from the user includes data characterizing acceptance of the recommendation for acquiring the view, and
wherein the control signal is configured to activate a video camera in the inspection system to capture the video.

26. The method of claim 20, further comprising:
determining that the new inspection of the inspection region includes acquiring multiple images of the inspection region during a predetermined time period; and
determining a new set of operating parameters associated with a turning tool of the inspection system, wherein the turning tool is coupled to the inspection region and is configured to move the inspection region,
wherein the notification includes a recommendation for acquiring the multiple images of the inspection region and the new set of operating parameters associated with the turning tool.

27. The method of claim 26, wherein the input from the user includes data characterizing acceptance of the recommendation for acquiring the multiple images.

28. The method of claim 27, wherein the control signal is configured vary a state of the turning tool, wherein the control signal is based on the new set of operating parameters.

29. The method of claim 27, wherein the control signal is configured to vary a speed of rotation associated with the turning tool and the inspection region relative to the camera.

30. The method of claim 27, wherein the control signal is configured to move the turning tool back and forth resulting in a back and forth motion of the inspection region relative to the camera.

31. The method of claim 27, wherein the control signal is configured to move the turning tool such that the resulting motion of the inspection region matches a motion of the camera.

32. The method of claim 1, wherein the data characterizing the one or more images is associated with a video of the inspection region.

33. A system comprising:
at least one data processor;
memory coupled to the at least one data processor, the memory storing instructions to cause the at least one data processor to perform operations comprising:
receiving data characterizing one or more images of an inspection region of an industrial machine acquired by an inspection system operating based on a first set of operating parameters, wherein the inspection region includes a site feature;
determining, by an analytical model, one or more characteristics of the inspection region from the received data characterizing the one or more images of the inspection region; and
generating a control signal based on the one or more characteristics of the inspection region, wherein the inspection system is configured to perform a new inspection of the inspection region based on the control signal,
wherein the control signal is configured to activate one or more cameras in the inspection system to capture multiple images, wherein the captured multiple images are used to generate one or more of a panoramic image, a stereoscopic image and a 3D point cloud image.

34. A computer program product comprising a non-transitory machine-readable medium storing instructions that, when executed by at least one programmable processor that comprises at least one physical core and a plurality of logical cores, cause the at least one programmable processor to perform operations comprising:
receiving data characterizing one or more images of an inspection region of an industrial machine acquired by an inspection system operating based on a first set of operating parameters, wherein the inspection region includes a site feature;
determining, by an analytical model, one or more characteristics of the inspection region from the received data characterizing the one or more images of the inspection region; and
generating a control signal based on the one or more characteristics of the inspection region, wherein the inspection system is configured to perform a new inspection of the inspection region based on the control signal,
wherein the control signal is configured to activate one or more cameras in the inspection system to capture multiple images, wherein the captured multiple images are used to generate one or more of a panoramic image, a stereoscopic image and a 3D point cloud image.

* * * * *